US012567592B2

(12) United States Patent
Park et al.

(10) Patent No.: US 12,567,592 B2
(45) Date of Patent: Mar. 3, 2026

(54) PALLADIUM-TRANSITION METAL CORE-BASED CORE-SHELL ELECTRODE CATALYST AND MANUFACTURING METHOD FOR THE SAME

(71) Applicant: KOREA INSTITUTE OF ENERGY RESEARCH, Daejeon (KR)

(72) Inventors: Gu-gon Park, Daejeon (KR); Eunjik Lee, Sejong-si (KR); Ik Sung Lim, Daejeon (KR); Sung-Dae Yim, Daejeon (KR); Seok-Hee Park, Daejeon (KR); Minjin Kim, Daejeon (KR); Young-Jun Sohn, Daejeon (KR); Byungchan Bae, Daejeon (KR); Seung-gon Kim, Daejeon (KR); Dongwon Shin, Sejong-si (KR); Hwanyeong Oh, Daejeon (KR); Seung Hee Woo, Daejeon (KR); So Jeong Lee, Daejeon (KR); Hyejin Lee, Daejeon (KR); Yoon Young Choi, Sejong-si (KR); Yun Sik Kang, Seongnam-si (KR); Won-yong Lee, Daejeon (KR); Tae-hyun Yang, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 496 days.

(21) Appl. No.: 18/161,941

(22) Filed: Jan. 31, 2023

(65) Prior Publication Data

US 2023/0378480 A1      Nov. 23, 2023

(30) Foreign Application Priority Data

May 18, 2022    (KR) ........................ 10-2022-0060615

(51) Int. Cl.
*H01M 4/88* (2006.01)
*H01M 4/86* (2006.01)
*H01M 4/90* (2006.01)

(52) U.S. Cl.
CPC ....... *H01M 4/8882* (2013.01); *H01M 4/8657* (2013.01); *H01M 4/9058* (2013.01)

(58) Field of Classification Search
CPC ....... H01M 2008/1095; H01M 4/8657; H01M 4/88; H01M 4/8882; H01M 4/9058; H01M 4/921; H01M 4/926; Y02E 60/50
See application file for complete search history.

(56) References Cited

U.S. PATENT DOCUMENTS

2022/0223881 A1* 7/2022 Jang ...................... H01M 4/921
2023/0395814 A1* 12/2023 Suzuki ................ H01M 4/8652

FOREIGN PATENT DOCUMENTS

KR      10-2020-0107175 A      9/2020
KR          10-2247835 B1      5/2021
(Continued)

OTHER PUBLICATIONS

Cicero W.B. Bezerra et al., "A review of heat-treatment effects on activity and stability of PEM fuel cell catalysts for oxygen reduction reaction", Journal of Power Sources 173 Aug. 19, 2007 891-908.
(Continued)

*Primary Examiner* — Victoria H Lynch
(74) *Attorney, Agent, or Firm* — Rabin & Berdo, P.C.

(57) ABSTRACT

The manufacturing method of a palladium transition metal core-based core-shell electrode catalyst according to an exemplary embodiment of the present disclosure includes a first step of preparing a slurry by irradiating ultrasonic wave to a dispersion solution including a solvent, a platinum precursor, a palladium precursor, a carbon support, and a transition metal precursor, a second step of preparing a solid
(Continued)

material by filtering, washing, and drying the slurry prepared in the first step, and a third step of preparing a core-shell electrode catalyst by thermally treating the solid prepared in the second step in a specific gas atmosphere.

5 Claims, 6 Drawing Sheets

(56)                          References Cited

FOREIGN PATENT DOCUMENTS

| KR | 10-2260508 B1 | 6/2021 |
|---|---|---|
| KR | 10-2290142 B1 | 8/2021 |
| KR | 10-2021-0130031 A | 10/2021 |
| KR | 10-2022-0033545 A | 3/2022 |
| KR | 10-2022-0033547 A | 3/2022 |
| KR | 10-2022-0033548 A | 3/2022 |
| KR | 10-2022-0033549 A | 3/2022 |
| KR | 20220049500 A | 4/2022 |

OTHER PUBLICATIONS

Hyun-Uk Park et al., "Ternary core-shell PdM@Pt (M =Mn and Fe) nanoparticle electrocatalysts with enhanced ORR catalytic properties", Ultrasonics—Sonochemistry 58 Jul. 4, 2019.104673.

* cited by examiner

FIG. 5

PALLADIUM-TRANSITION METAL CORE-BASED CORE-SHELL ELECTRODE CATALYST AND MANUFACTURING METHOD FOR THE SAME

CROSS-REFERENCE TO RELATED APPLICATIONS

This application claims the priority of Korean Patent Application No. 10-2022-0060615 filed on May 18, 2022, in the Korean Intellectual Property Office, the disclosure of which is incorporated herein by reference.

BACKGROUND

Field

The present disclosure relates to a palladium transition metal core-based core-shell electrode catalyst.

Description of the Related Art

Generally, a fuel cell which is in the spotlight as a next-generation energy source is a device which directly converts chemical energy generated by oxidation/reduction of fuel into an electric energy and is expected as a future electric power source for transportation such as electric vehicles and power supply at homes. An electrode reaction in the fuel cell is configured by a hydrogen oxidation reaction in a negative electrode and an oxygen reduction reaction in a positive electrode. Therefore, in order for a fuel-cell system which is driven at a low temperature such as polymer electrolyte membrane fuel cell to actually occur smoothly the electrochemical reaction, a reaction rate needs to be effectively increased.

Fuel cells which use hydrogen as a fuel are in the spotlight as a next generation energy conversion technology and among them, polymer electrolyte fuel cells with high power density and fast start-up are expected to be commercialized in various fields from power devices for portable electronic devices to transportation and power generation. However, the increase of system manufacturing cost due to a high price of platinum which is used as a catalyst of the fuel cell is delaying full-scale commercialization. Accordingly, studies are being conducted to a direction to reduce the use of high price platinum and increase the performance and durability of the fuel-cell system.

That is, for the same reason as above, platinum (Pt) which is a noble metal catalyst has inevitably been used in the fuel cell system of the related art. However, despite the excellent energy conversion efficiency of the platinum catalyst, there may be a problem for the popularization of the fuel cell due to the very high price and the limited reserve of the platinum catalyst. Specifically, the necessity of the new electrical catalyst with a high efficiency and a low cost is the most urgent among the problems related to the polymer electrolyte membrane fuel cell (PEMFC).

In order to solve the above-mentioned obstacles and accelerate the commercialization of the fuel cell, recently, nanoparticles (multi-component nanoparticles) including a plurality of components, such as alloy nanoparticles and core-shell nanoparticles, are being studied to replace the platinum electrode supported on the current carbon support. In this method, a heat treatment process is essentially used to manufacture stable alloy particles, but a high temperature heat treatment process has a disadvantage in that the size of the nanoparticles grows to reduce the active area.

In order to suppress the growth of the size of the nanoparticles, various methods, such as a method of forming a protective layer using an inorganic or organic component on the nanoparticles before performing the high temperature heat treatment process, are proposed. However, this method has a limitation to apply mass production because additional process with complex and multiple steps is required to remove the inorganic or organic compound used for the protective layer after the heat treatment process.

Further, in order to commercialize the polymer electrolyte fuel cell (PEFC), research and development for an electrode catalyst having very excellent activity and durability are necessary to reduce the use of the noble metal (Pt or Pd) of the catalyst layer while improving the slow oxygen reduction reaction (ORR).

RELATED ART DOCUMENT

Patent Document (Patent Document 1) Korean Registered Patent Publication No. 10-2247835 (May 4, 2021)

SUMMARY

The present disclosure has been made to solve the above-described problems and an object of the present disclosure is to provide a palladium-transition metal core-based core-shell electrode catalyst having very excellent activity and durability to reduce the use of the noble metal (Pt or Pd) of a catalyst layer while improving the slow oxygen reduction reaction (ORR), and a manufacturing method thereof, thereby commercializing the polymer electrolyte fuel cell (PEFC).

Technical objects to be achieved in the present disclosure are not limited to the aforementioned technical objects, and another not-mentioned technical object will be obviously understood by those skilled in the art from the description below.

According to an aspect of the present disclosure, a manufacturing method of a palladium-transition metal core-based core-shell electrode catalyst includes: a first step of preparing a slurry by irradiating ultrasonic wave to a dispersion solution including a solvent, a platinum precursor, a palladium precursor, a carbon support, and a transition metal precursor; a second step of preparing a solid material by filtering, washing, and drying the slurry prepared in the first step; and a third step of preparing a core-shell electrode catalyst by thermally treating the solid prepared in the second step in a specific gas atmosphere.

In the manufacturing method of a palladium transition metal core-based core-shell electrode catalyst according to an exemplary embodiment of the present disclosure, the transition metal may be any one or more selected from the group consisting of cobalt (Co), nickel (Ni), magnesium (Mn), and iron (Fe).

In the manufacturing method of a palladium transition metal core-based core-shell electrode catalyst according to an exemplary embodiment of the present disclosure, in the third step, when the transition metal is cobalt (Co), the gas atmosphere may be a gas atmosphere including ammonia and nitrogen.

In the manufacturing method of a palladium transition metal core-based core-shell electrode catalyst according to an exemplary embodiment of the present disclosure, in the third step, when the transition metal is cobalt (Co), the gas atmosphere may be a gas atmosphere including hydrogen and nitrogen.

In the manufacturing method of a palladium transition metal core-based core-shell electrode catalyst according to an exemplary embodiment of the present disclosure, in the third step, when the transition metal is cobalt (Co), the gas atmosphere may be an inert gas atmosphere including nitrogen.

In the manufacturing method of a palladium transition metal core-based core-shell electrode catalyst according to an exemplary embodiment of the present disclosure, in the third step, when the transition metal is nickel (Ni), manganese (Mn), and iron (Fe), the heat treatment may be performed in a hydrogen or ammonia gas atmosphere.

In the manufacturing method of a palladium transition metal core-based core-shell electrode catalyst according to an exemplary embodiment of the present disclosure, in the third step, the heat treatment may be performed on the solid material prepared in the second step in the gas atmosphere including at least one of hydrogen, nitrogen, and ammonia, at a temperature of 400 to 500° C., for one to three hours.

According to another aspect of the present disclosure, a palladium-transition metal core-based core-shell electrode catalyst is prepared by a manufacturing method of the palladium-transition metal core-based core-shell electrode catalyst.

According to another aspect of the present disclosure, the palladium transition metal core-based core-shell electrode catalyst may have an average particle size of 2.2 to 4.1 nm.

According to another aspect of the present disclosure, the palladium transition metal core-based core-shell electrode catalyst may have an activity per mass (mass activity) of 0.5 to 0.75 A/mgPGM and an activity per unit area (specific activity) of 1160 to 1400 $\mu Acm^{-2}$.

According to the present disclosure, the heat treatment is performed in various gas atmospheres so that an average particle size is small while having an excellent stability (durability), and dispersibility and uniformity are excellent.

Further, according to the present disclosure, a complex post-processing process for removing the protective layer of the related art is not performed so that the overall manufacturing process of the nanoparticles becomes simple and easy and has an economic advantage.

Further, the present disclosure achieves small and uniform average particle sizes with a simple process and achieves excellent stability (durability) to enable the mass production, to be easily applied to the industrial environment.

BRIEF DESCRIPTION OF THE DRAWINGS

FIG. 5 is a transmission electron microscopy (TEM) photo representing a particle size, a particle uniformity, and dispersibility of a core-shell electrode catalyst manufactured according to Comparative Example 1 and Example Embodiments 1 to 3 of the present disclosure;

DETAILED DESCRIPTION OF THE EMBODIMENT

Figure 1:
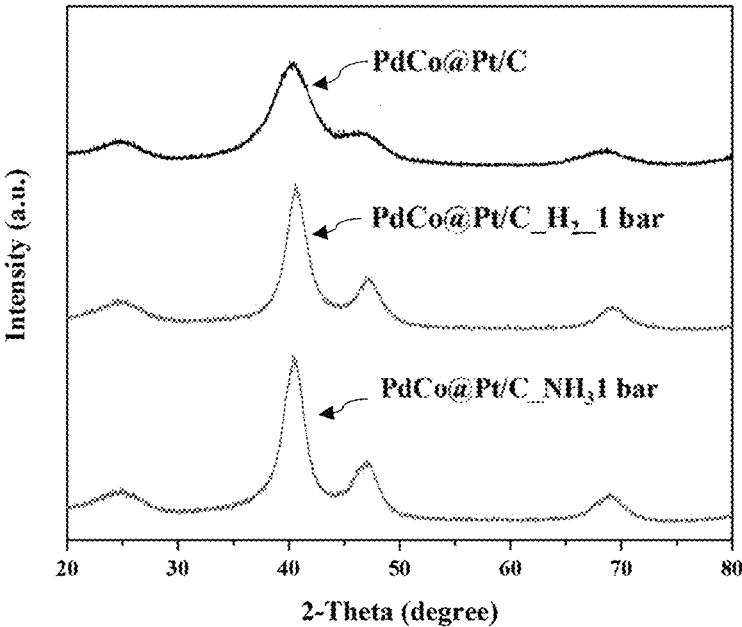
FIGS. 1 to 4 are X-ray diffraction (XRD) photos of a core-shell electrode catalyst manufactured according to Example Embodiments 1 to 9 and Comparative Examples 1 to 4 of the present disclosure.
Figure 2:
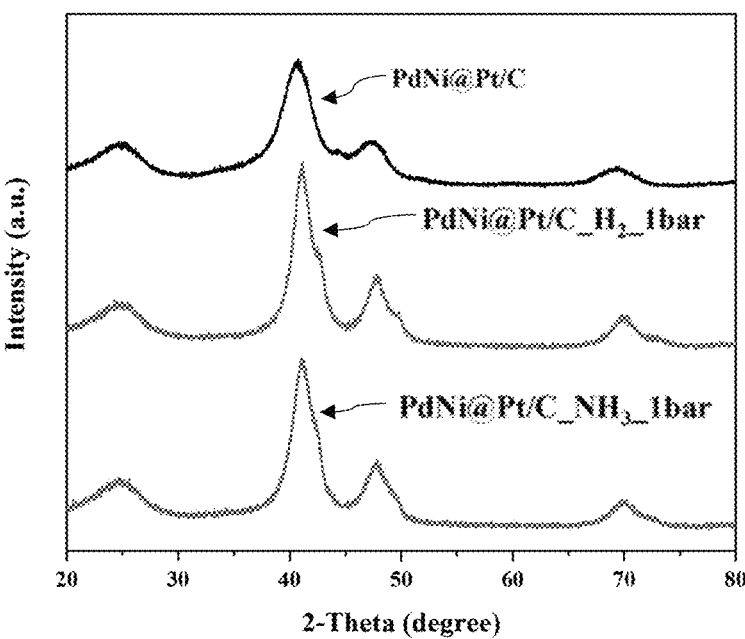
Figure 3:
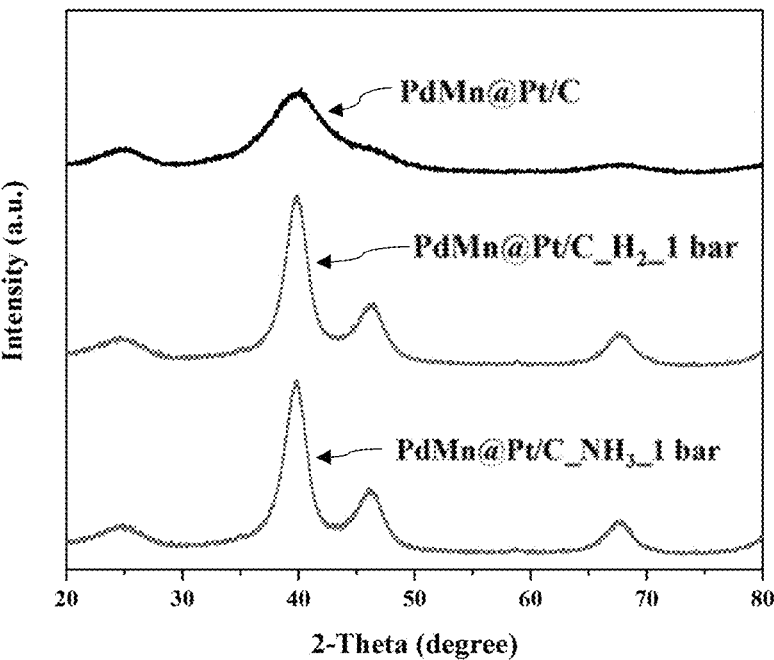
Figure 4:
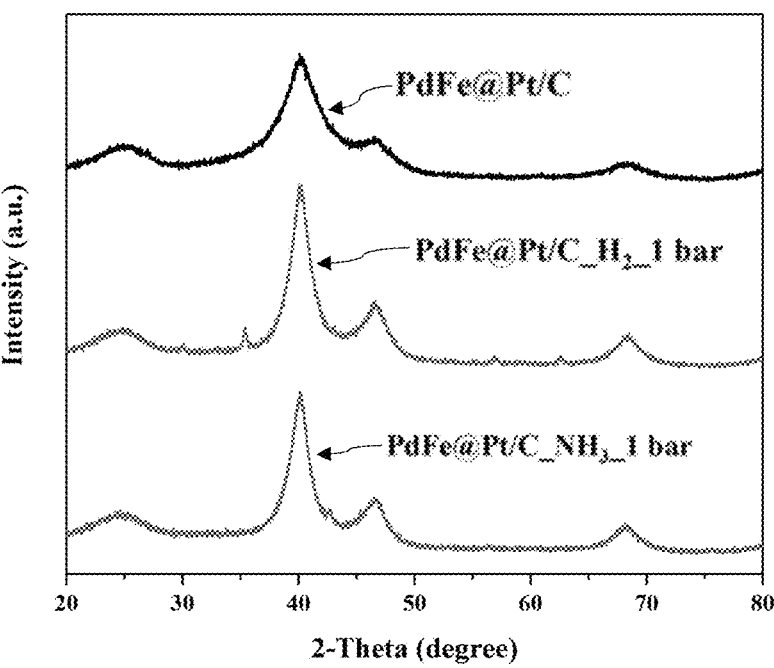

In the following detailed description, only certain exemplary embodiments of the present disclosure have been shown and described, simply by way of illustration. Description of the present disclosure is just an embodiment for structural and functional description so that the scope of the present disclosure is not interpreted to be limited by the embodiment described in the specification. That is, the embodiment may be modified in various forms so that it is understood that the scope of the present disclosure has equivalents which are capable of implementing the technical spirit. Further, it does not mean that the specific embodiment includes the object or effect proposed in the present disclosure or include only the effect so that it is not understood that the scope of the present disclosure is limited thereby.

In the meantime, meanings of terms described in the present disclosure can be understood as follows.

The terms "first" or "second" are used to distinguish one component from the other component so that the scope should not be limited by these terms. For example, a first component may be referred to as a second component, and similarly, a second component may be referred to as a first component. It should be understood that, when it is described that an element is "connected" to another element, the element may be directly connected to the other element or connected to the other element through a third element. In contrast, it should be understood that, when it is described that an element is directly connected to another element, no element is present between the element and the other element. Other expressions which describe the relationship between components, that is, "between" and "directly between", or "adjacent to" and "directly adjacent to" need to be interpreted by the same manner.

Unless the context apparently indicates otherwise, it should be understood that terms "include" or "have" indicate that a feature, a number, a step, an operation, a component, a part or the combination thereof described in the specification is present, but do not exclude a possibility of presence or addition of one or more other features, numbers, steps, operations, components, parts or combinations thereof, in advance.

Unless they are contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present disclosure.

The present disclosure relates to a method of controlling a size of a core-shell nanoparticle by adjusting a type of gas used for heat treatment, and is configured by a process of manufacturing the core-shell nanoparticle by a sonochemical method and a heat treatment process at a high temperature to improve the stability of the manufactured nanoparticle.

The manufacturing method of a palladium transition metal core-based core-shell electrode catalyst according to an exemplary embodiment of the present disclosure includes a first step of preparing a slurry by irradiating ultrasonic wave to a dispersion solution including a solvent, a platinum precursor, a palladium precursor, a carbon support, and a transition metal precursor; a second step of preparing a solid material by filtering, washing, and drying the slurry prepared in the first step; and a third step of preparing a core-shell electrode catalyst by performing heat treatment on the solid material prepared in the second step in a gas atmosphere including at least one of hydrogen, nitrogen, and ammonia.

Hereinafter, the manufacturing method of a palladium transition metal core-based core-shell electrode catalyst according to an exemplary embodiment of the present disclosure will be specifically described for every step.

First, in the first step, a slurry is prepared by irradiating ultrasonic wave to a dispersion solution including a solvent, a platinum precursor, a palladium precursor, a carbon support, and a transition metal precursor.

High frequency oscillation of the ultrasonic wave generates bubbles in a cavity, which causes the oscillatory growth, and finally, it reaches to a specific size and then the cavity is exploded. Such a series of processes caused by the ultrasonic irradiation is referred to as "acoustics cavitation mechanism". Huge heat energy which reaches approximately 5000 K may be caused by the cavity explosion generated in the final step of the acoustics cavitation mechanism, and the extinction thereof is generated in a very short period of time of approximately $10^{-6}$ seconds.

When a reactant in the chemical reaction involving the ultrasonic irradiation is two or more materials having different vapor pressures, speeds of evaporating two or more reactants to bubbles by the high frequency vibration of the ultrasonic wave are different, and the structural and electrochemical characteristics of the reactants may be adjusted using the characteristics. For example, when two or more metal precursors are used as reactants and the ultrasonic wave is irradiated to manufacture nanoparticles including two or more metals, the distribution of two or more metal elements in the nanoparticles may be adjusted according to the difference in the vapor pressures of two or more metal precursors. For example, a metal precursor having a low vapor pressure in the nanoparticle is located in the shell part and a metal precursor having a high vapor pressure is located in a core part to obtain electrode catalyst nanoparticles with a core-shell structure with adjusted element distribution.

For example, according to the present disclosure, the ultrasonic wave may be irradiated for two to four hours at 40% of amplitude (300 W) and a temperature of 160 to 165° C.

The solvent is generally used in this field as a reducing solvent, and may be used an organic material which does not have moisture and an oxygen source. Specifically, the solvent may have a reducing power at a temperature of 70° C. or higher, and to be more specifically, may have a reducing power at a temperature of 70° C. to approximately 400° C. For example, the solvent may be one or more ethylene glycols selected from the group consisting of di-ethylene glycol (EG), tri-ethylene glycol, and poly-ethylene glycol. The reducing solvent serves to reduce the metal precursor which is a reactant in the cavity formed by the ultrasonic treatment, and maintains a high boiling point to form an external liquid environment in which the cavity is created and extinct.

The transition metal precursor is generally used in the art and is not particularly limited, but may be one or more selected from the group consisting of cobalt (Co), nickel (Ni), manganese (Mn), and iron (Fe). The transition metal precursor is quickly volatilized by a high vapor pressure and quickly trapped in the cavity by ultrasonic waves, and thus, in the core-shell structure, which is a reaction product, the transition metal may be located in the core part.

The carbon support is a support of a core-shell electrode catalyst nanoparticle and is not particularly limited as long as it is generally used in the art. For example, a porous carbon support may be used. When the porous carbon support is used, more electrode catalyst nanoparticles with a core-shell structure may be efficiently supported due to the large surface area.

In addition, a metal oxide which supports the electrode catalyst with a core-shell structure may be used.

According to the present disclosure, when the ultrasonic wave is irradiated, a cavity is formed, and the transition metal precursor is trapped by the cavity earlier than the noble metal precursor due to the difference in the vapor pressure to form a core. Specifically, the transition metal precursor is volatilized prior to the noble metal precursor to be first trapped by the cavity formed by the irradiation of the ultrasonic wave. Thereafter, the noble metal precursor is deposited on the core to form a shell.

In the core-shell catalyst according to the present disclosure, the transition metal is located in the core part to lower the unit price of the electrode catalyst, and the noble metal (Pt, Pd) is located in the shell part so that the stability is high to extend the life-span of the electrode catalyst. According to the present disclosure, among various transition metals and noble metals, an iron or cobalt core and a platinum shell are desirable.

Next, as a second step, a slurry prepared in the first step is filtered, washed, and then dried to prepare a solid material.

The slurry prepared in the first step may be filtered using a PTFE membrane filter (a diameter is 90 mm, and a pore size is 0.4 μm). Ignition may be prevented by sufficiently removing ethylene glycol (EG), and then washing with excess ethanol and distilled water to remove residual ethylene glycol (EG). Next, dry may be performed for 10 to 15 hours in a vacuum oven of 60 to 80° C.

Next, as a third step, a core-shell electrode catalyst is prepared by performing heat treatment on the solid material prepared in the second step in a gas atmosphere including at least one of hydrogen, nitrogen, and ammonia.

Specifically, the heat treatment may be performed on the solid material prepared in the second step in the gas atmosphere including at least one of hydrogen, nitrogen, and ammonia, at a pressure of 1 bar, a temperature of 400 to 500° C., for one to three hours.

When the temperature is below 400° C. or above 500° C., the stability of the nanoparticles may be degraded. Further, when the heat treatment time exceeds three hours, the size of the nanoparticle is increased so that an active region may be reduced.

When the transition metal is cobalt (Co), the heat treatment may be performed in a gas atmosphere including 5 vol % of hydrogen and 95 vol % of nitrogen or 5 vol % of ammonia and 95 vol % of nitrogen.

Further, when the transition metal is nickel (Ni), manganese (Mn), and iron (Fe), the heat treatment may be performed in a hydrogen or ammonia gas atmosphere.

The core-shell electrode catalyst obtained by the above-described method has an average particle size of 3 to 5 nm, and desirably 2.2 to 4.1 nm, and an activity per mass (mass activity) of 0.5 to 0.75 A/mgPGM, and an activity per unit area (specific activity) of 1160 to 1400 μAcm².

The core-shell electrode catalyst may have a half-wave potential of 910 to 930 mV which is confirmed by the linear shift voltage curve (LSV) before and after 30 k cycle of accelerated stress test (AST). At this time, the accelerated stress test (AST) measures repeated times for 30 k cycles at 0.6 V for 3 seconds and 0.95 V for 3 seconds, and the linear shift voltage curve (LSV) measures in the range from 0.0 V to 1.1 V (vs. RHE) in $O_2$ saturated 0.1 M $HClO_4$ at a scan rate of 10 mV s$^{-1}$ and a rotation speed of 1600 rpm.

Example Embodiment 1

A dispersion solution including 0.520 g of platinum (II) acetylacetonate (platinum (II) acetylacetonate, Pt(acac)$_2$, 97%, sigma aldrich), 0.04 g (0.13 mmol) of Pd(acac)$_2$, 0.299 g (1.15 mol) of Co(acac)$_2$ among transition metals, and 0.675 g of carbon support (Vulcan XC-72R, BET surface area: 250 m$^2$g$^{-1}$, particle size: 30 to 40 nm, manufactured by Cabot Corporation) was put in a nitrogen ($N_2$) purged ethyleneglycol (EG) and was irradiated with ultrasonic wave through a high intensity. At this time, the ultrasonic wave was irradiated for three hours using a horn type ultrasonic machine (Sonic & Materials, VCS750, 40% of amplitude, 13 mm solid probe, and 20 kHz).

After irradiating the ultrasonic wave, the prepared black slurry was filtered using a PTFE membrane filter (with a diameter of 90 mm and a pore size of 0.4 μm), and then ethylene glycol (EG) was sufficiently removed, and the filtered sample was further washed with excess ethanol and distilled water, and finally, dried in a vacuum oven for 12 hours at 70° C.

The solid sample was thermally treated for two hours at 510° C. using a high-pressure furnace in a hydrogen ($H_2$) gas atmosphere at a pressure of 1 bar to prepare a core-shell electrode catalyst (PdCo@Pt/C_H$_2$_1bar).

Example Embodiment 2

The same as Example Embodiment 1 was carried out, but the heat treatment on the solid sample was performed in a gas atmosphere including 5 vol % of ammonia ($NH_3$) and 95 vol % of nitrogen ($N_2$) to prepare a core-shell electrode catalyst (PdCo@Pt/C_NH$_3$_1bar).

Example Embodiment 3

The same as Example Embodiment 1 was carried out, but the heat treatment was performed on the solid sample in a gas atmosphere including 5 vol % of hydrogen ($H_2$) and 95 vol % of nitrogen ($N_2$) to prepare a core-shell electrode catalyst (PdCo@Pt/C_N$_2$_1bar).

Example Embodiment 4

The same as Example Embodiment 1 was carried out, but Ni among the transition metals was used and the heat treatment on the solid sample was performed in the hydrogen ($H_2$) atmosphere to prepare a core-shell electrode catalyst (PdNi@Pt/C_H$_2$_1bar).

Example Embodiment 5

The same as Example Embodiment 4 was carried out, but the heat treatment on the solid sample was performed in a gas atmosphere including 5 vol % of ammonia ($NH_3$) and 95 vol % of nitrogen ($N_2$) to prepare a core-shell electrode catalyst (PdNi@Pt/C_NH$_3$_1bar).

Example Embodiment 6

The same as Example Embodiment 1 was carried out, but Mn among the transition metals was used and the heat treatment on the solid sample was performed in the hydrogen ($H_2$) atmosphere to prepare a core-shell electrode catalyst (PdNi@Pt/C_H$_2$_1bar).

Example Embodiment 7

The same as Example Embodiment 6 was carried out, but the heat treatment on the solid sample was performed in a gas atmosphere including 5 vol % of ammonia ($NH_3$) and 95 vol % of nitrogen ($N_2$) to prepare core-shell electrode catalyst (PdMn@Pt/C_NH$_3$_1bar).

Example Embodiment 8

The same as Example Embodiment 1 was carried out, but Fe among the transition metals was used and the heat treatment on the solid sample was performed in the hydrogen ($H_2$) atmosphere to prepare a core-shell electrode catalyst (PdFe@Pt/C_H$_2$_1bar).

Example Embodiment 9

The same as Example Embodiment 8 was carried out, but the heat treatment on the solid sample was performed in a gas atmosphere including 5 vol % of ammonia ($NH_3$) and 95 vol % of nitrogen ($N_2$) to prepare a core-shell electrode catalyst (PdFe@Pt/C_NH$_3$_1bar).

Comparative Example 1

The same as Example Embodiment 1 was carried out, but Co among the transition metals was used and the heat treatment on the solid sample was omitted to prepare a core-shell electrode catalyst (PdCo@Pt/C).

Comparative Example 2

The same as Example Embodiment 1 was carried out, but Ni among the transition metals was used and the heat treatment on the solid sample was omitted to prepare a core-shell electrode catalyst (PdNi@Pt/C).

Comparative Example 3

The same as Example Embodiment 1 was carried out, but Mn among the transition metals was used and the heat treatment on the solid sample was omitted to prepare a core-shell electrode catalyst (PdMn@Pt/C).

Comparative Example 4

The same as Example Embodiment 1 was carried out, but Fe among the transition metals was used and the heat treatment on the solid sample was omitted to prepare a core-shell electrode catalyst (PdFe@Pt/C).

Comparative Example 5

Commercial Pt/C catalyst (37.8 wt %, HiSPEC4000 product, Johnson Matthey)

Experimental Example

FIGS. 1 to 4 are X-ray diffraction (XRD) photos of a core-shell electrode catalyst prepared according to Example Embodiments 1 to 9 and Comparative Examples 1 to 4 of the present disclosure.

Figure 5:
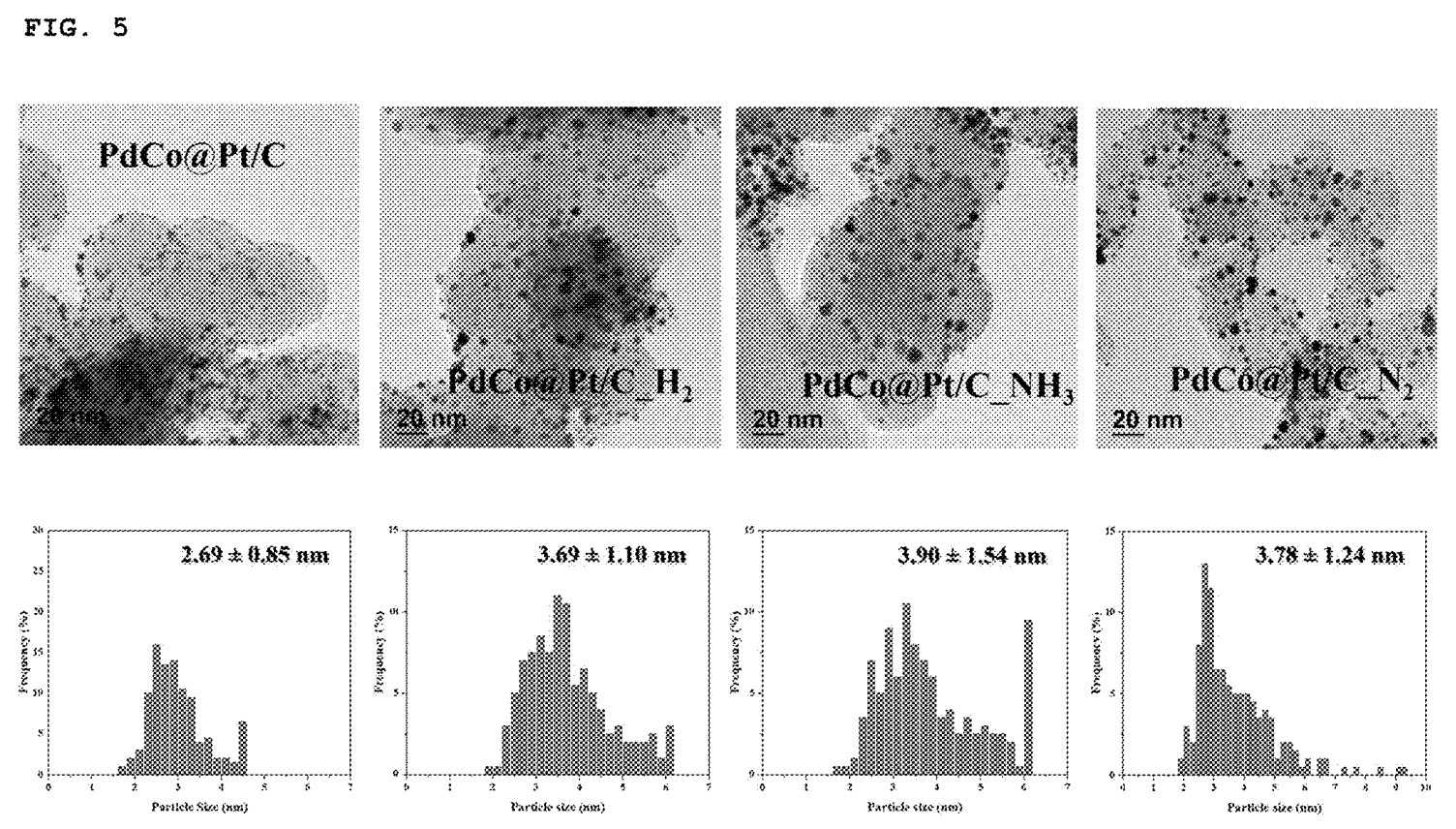

FIG. 5 is a transmission electron microscopy (TEM) photo representing a particle size, a particle uniformity, and dispersibility of a core-shell electrode catalyst manufactured according to Comparative Example 1 and Example Embodiments 1 to 3 of the present disclosure.

Results of FIGS. 1 to 5 were summarized to be represented in Tables 1 to 4.

TABLE 1

| | Pt—Pt distance | Particle size (nm) | Supported amount (ICP) | | |
| | (nm) | XRD | Pt wt % | Pd wt % | Co wt % |
| --- | --- | --- | --- | --- | --- |
| Comp. Ex. 1 | 0.2737 | 2.46 | 24.4 | 1.3 | 5.3 |
| Ex. Em. 1 | 0.2711 | 3.69 | 24.2 | 1.3 | 5.2 |
| Ex. Em. 2 | 0.2728 | 3.45 | 23.9 | 1.2 | 5.1 |
| Ex. Em. 3 | 0.2721 | 3.94 | 24.3 | 1.3 | 5.2 |

As represented in Table 1, in Example Embodiments 1 to 3 prepared according to the present disclosure, it was confirmed that the particles had an average size which was distributed in the range of 3.4 to 3.94 nm and contained Pt and Co.

TABLE 2

| | Pt—Pt distance | Particle size (nm) | Supported amount (ICP) | | |
| | (nm) | XRD | Pt wt % | Pd wt % | Ni wt % |
| --- | --- | --- | --- | --- | --- |
| Comp. Ex. 2 | 0.2715 | 3.10 | 15.9 | 1.2 | 5.7 |
| Ex. Em. 4 | 0.2693 | 3.99 | 13.8 | 1.2 | 6.5 |
| Ex. Em. 5 | 0.2692 | 4.04 | 16.8 | 1.5 | 6.2 |

As represented in Table 2, in Example Embodiments 4 and 5 produced according to the present disclosure, it was confirmed that particles had an average size which was distributed in the range of 3.99 to 4.04 nm and contained Pt and Ni. Further, it was confirmed that as compared with Comparative Example 2, Example Embodiments 4 and 5 had a higher content of Ni.

TABLE 3

| | Pt—Pt distance | Particle size (nm) | Supported amount (ICP) | | |
| | (nm) | XRD | Pt wt % | Pd wt % | Mn wt % |
| --- | --- | --- | --- | --- | --- |
| Comp. Ex. 3 | 0.2768 | 2.22 | 23.6 | 1.1 | 2.3 |
| Ex. Em. 6 | 0.2769 | 3.54 | 23.6 | 1.1 | 2.3 |
| Ex. Em. 7 | 0.2775 | 3.53 | 21.4 | 1.1 | 2.2 |

As represented in Table 3, in Example Embodiments 6 and 7 produced according to the present disclosure, it was confirmed that the particles had an average size which was distributed in approximately 3.5 nm and contained Pt and Mn.

TABLE 4

| | Pt—Pt distance | Particle size (nm) | Supported amount (ICP) | | |
| | (nm) | XRD | Pt wt % | Pd wt % | Fe wt % |
| --- | --- | --- | --- | --- | --- |
| Comp. Ex. 4 | 0.2738 | 2.96 | 22.6 | 1.1 | 3.6 |
| Ex. Em. 8 | 0.2746 | 3.82 | 21.5 | 1.2 | 3.8 |
| Ex. Em. 9 | 0.2753 | 3.70 | 23.1 | 1.3 | 4.2 |

As represented in Table 4, in Example Embodiments 8 to 9 prepared according to the present disclosure, it was confirmed that the particles had an average size which is distributed in the range of 3.7 to 3.82 nm and contained Pt and Fe. Further, it was confirmed that as compared with Comparative Example 4, Example Embodiments 8 and 9 had a higher content of Fe.

Figure 6:
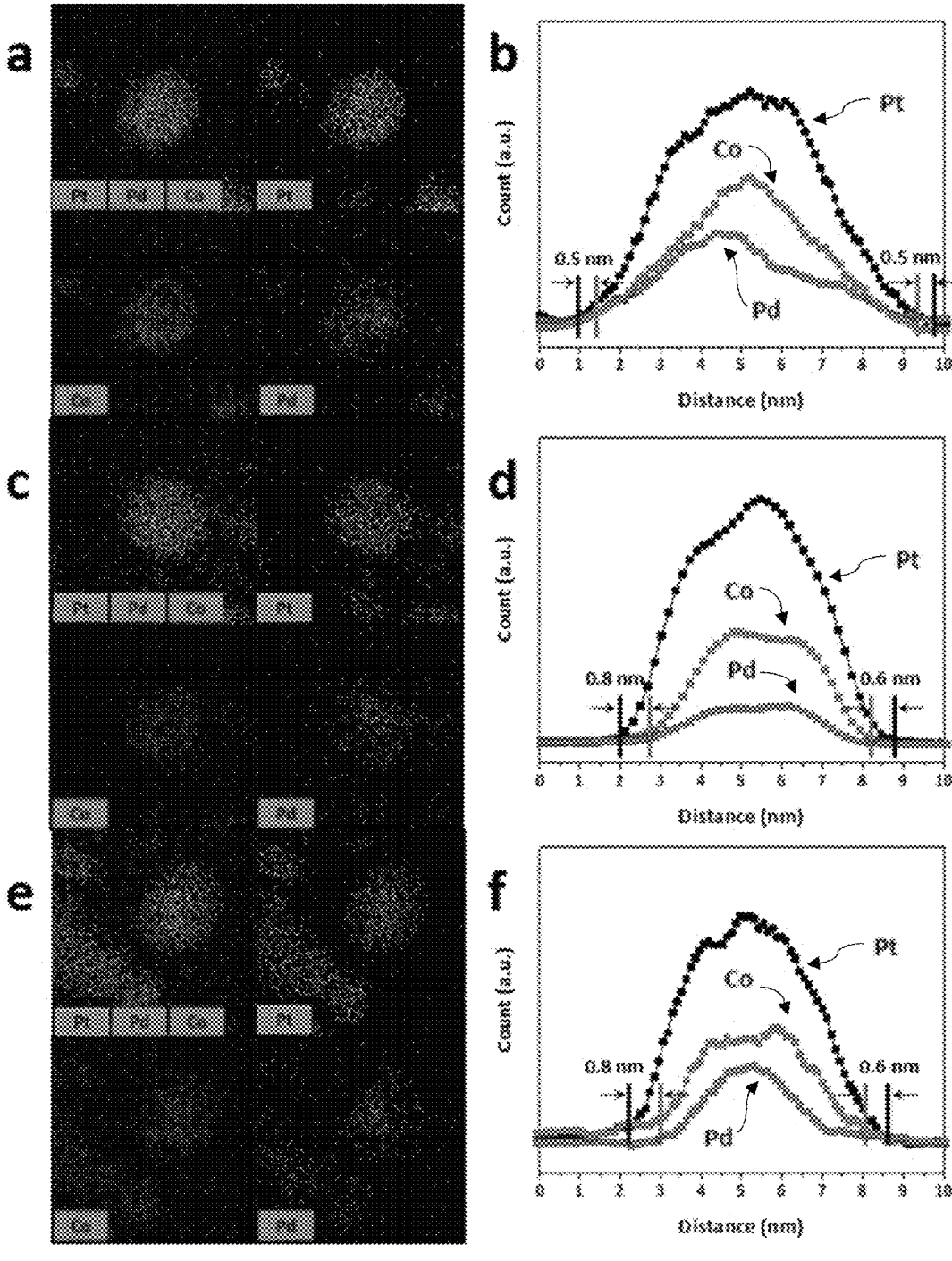
FIG. 6 is a scanning transmission electron microscopy (STEM) and energy dispersive spectrometry (EDS) of a core-shell electrode catalyst manufactured according to Example Embodiments 1 to 3 of the present disclosure.

In the meantime, FIG. 6 is a scanning transmission electron microscopy (STEM) and energy dispersive spectrometry (EDS) of a core-shell electrode catalyst manufactured according to Example Embodiments 1 to 3 of the present disclosure.

Here, FIGS. 6A and 6B correspond to Example Embodiment 3, FIGS. 6C and 6D correspond to Example Embodiment 1, and FIGS. 6E and 6F correspond to Example Embodiment 2.

Referring to FIG. 6, it was confirmed that the palladium-transition metal core-based core-shell electrode catalyst of the present disclosure has a core-shell structure.

Figure 7:
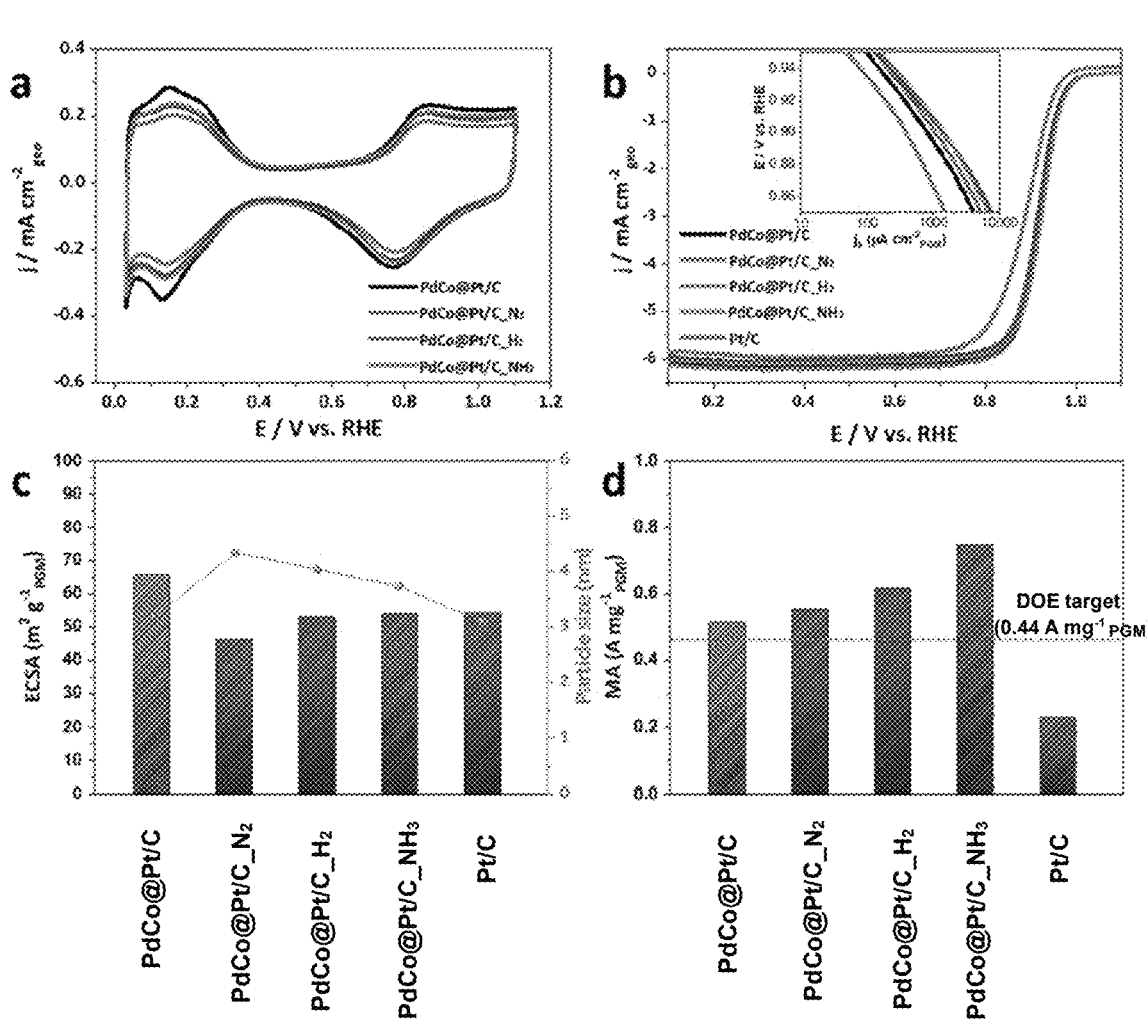
FIG. 7 illustrates an electrochemical analysis result of a core-shell electrode catalyst manufactured according to Example Embodiments 1 to 3.

FIG. 7 illustrates an electrochemical analysis result of an electrode catalyst manufactured according to Example Embodiments 1 to 3 and Comparative Examples 1 and 5. That is, in FIG. 7, a standard three-electrode system coupled with a rotary disk electrode RDE was used.

From FIG. 7, a rapid hydrogen desorption peak and Co oxidation peak for the Pd have not been observed so that it was confirmed that all catalyst surfaces form a Pt shell structure.

Specifically, FIG. 7 illustrates activity per unit area, activity per mass, and electrochemically active surface area (ECSA) of an electrode catalyst produced in Example Embodiments 1 to 3 and Comparative Examples 1 and 5 according to the present disclosure. That is, FIG. 7A is a cyclic voltage current curve (CV), FIG. 7B is a linear shift voltage curve (LSV) for ORR, FIG. 7C is an electrochemically active surface area (ECSAs), and FIG. 7D is a mass activity (MA).

Figure 8:
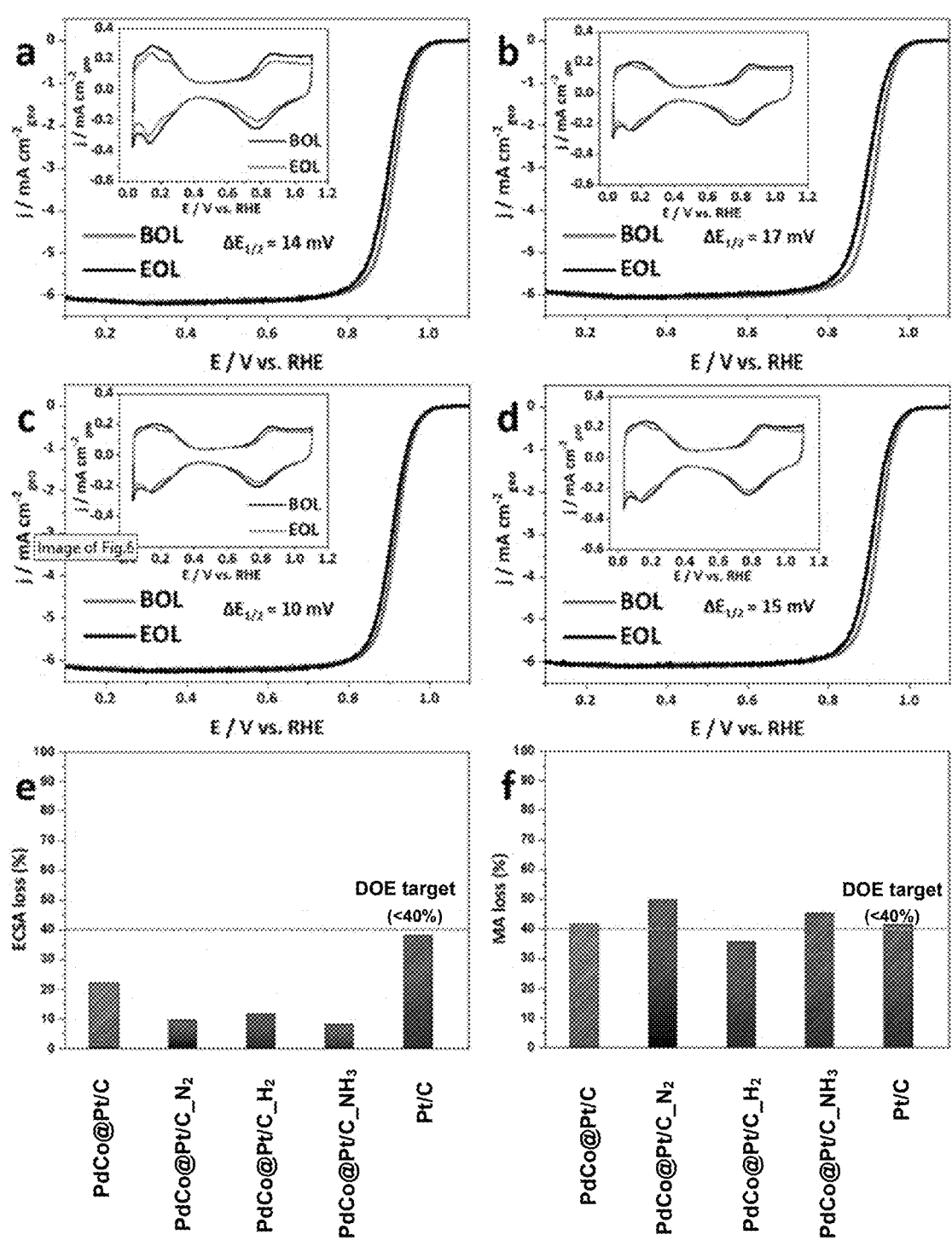
FIG. 8 illustrates a cyclic voltammetry curve (CV), a linear shift voltage curve (LSV), and an electrochemical analysis results before and after a 30 k cycles of accelerated stress test (AST) to confirm the durability of a core-shell electrode catalyst manufactured according to Example Embodiments 1 to 3 and Comparative Examples 1 and 5 of the present disclosure.

FIG. 8 illustrates a cyclic voltammetry curve (CV), a linear shift voltage curve (LSV), and an electrochemical analysis results before and after acceleration stress test (AST) 30 k cycle to confirm the durability of a core-shell electrode catalyst manufactured according to Example Embodiments 1 to 3 and Comparative Examples 1 and 5 of the present disclosure.

FIGS. 8A to 8D illustrate a cyclic voltage current curve (CV) and a linear shift current curve (LSV) before and after 30 k cycle of accelerated stress test (AST), and FIGS. 8E and 8F illustrate electrochemical surface area (ECSA) and mass activity (MA).

Results of FIGS. 7 and 8 are summarized in Table 5.

US 12,567,592 B2

11

12

TABLE 5

| | ECSA ($m^2g^{-1}_{PGM}$) | | MA ($Amg^{-1}_{PGM}$) | | SA ($uAcm^{-2}$) | | $E_{1/2}$ (mV) | |
|---|---|---|---|---|---|---|---|---|
| | BOL | EOL | BOL | EOL | BOL | EOL | BOL | EOL |
| Comp. Ex. 1 | 65.5 | 51.0 | 0.511 | 0.299 | 780.9 | 586.6 | 913 | 899 |
| Comp. Ex. 5 | 54.0 | 33.6 | 0.226 | 0.133 | 418.6 | 393.1 | 888 | 863 |
| Ex. Em. 1 | 52.8 | 46.8 | 0.613 | 0.395 | 1160.1 | 844.2 | 916 | 906 |
| Ex. Em. 2 | 53.7 | 49.4 | 0.747 | 0.408 | 1392.1 | 825.3 | 922 | 907 |
| Ex. Em. 3 | 46.2 | 41.9 | 0.550 | 0.277 | 1190.2 | 659.9 | 915 | 898 |

<ECSA: Electrochemical surface area, MA: Mass activity, SA: Specific activity, $E_{1/2}$: Half-wave potential, BOL: beginning of life, EOL: end of life>

In Table 5, the half-wave potential is one method of analyzing an oxygen reduction reaction activity of nanoparticles and means a potential at which current becomes half a dispersion limit current. The half-wave potential values are derived from FIG. 7B (linear shift voltage curve), respectively.

That is, it was confirmed that the activity per mass, the activity per unit area, and the half-wave potential of Example Embodiments 1 to 3 were significantly more excellent than those of Comparative Examples 1 and 5.

As seen from FIG. 8E, it was confirmed that Example Embodiments 1 to 3 in which the post heat treatment was performed had higher durability than Comparative Examples 1 and 5 in view of the electrochemical activity. In FIG. 8F, it was confirmed that Example Embodiments 1 and 2 in which the post-heat treatment was performed in a reducing atmosphere had a higher durability than that in Example Embodiment 3 in which the post heat treatment was performed in an inert atmosphere, in view of the mass activity.

As described above, the present disclosure has been specifically described with reference to Example Embodiments, but the above-described Example Embodiments are only described by using preferred examples of the present disclosure, and thus the present disclosure should not be construed as limited to the above-described Example Embodiments and the scope of the present disclosure should be construed by the claims and equivalents thereof to be described below.

What is claimed is:

1. A manufacturing method of a palladium-transition metal core-based core-shell electrode catalyst, comprising:
a first step of preparing a slurry by irradiating ultrasonic wave to a dispersion solution including a solvent, a platinum precursor, a palladium precursor, a carbon support, and a transition metal precursor;
a second step of preparing a solid material by filtering, washing, and drying the slurry prepared in the first step; and
a third step of preparing a core-shell electrode catalyst by thermally treating the solid material prepared in the second step at about 510° C. under a mixed gas atmosphere comprising ammonia ($NH_3$) and nitrogen ($N_2$).

2. The manufacturing method of a palladium-transition metal core-based core-shell electrode catalyst according to claim 1, wherein a transition metal in the transition metal precursor is any one or more selected from the group consisting of cobalt (Co), nickel (Ni), manganese (Mn), and iron (Fe).

3. A palladium-transition metal core-based core-shell electrode catalyst manufactured by the method according to claim 1.

4. The palladium-transition metal core-based core-shell electrode catalyst according to claim 3, wherein an average particle size of the palladium-transition metal core-based core-shell electrode catalyst is 2.2 to 4.1 nm.

5. The palladium-transition metal core-based core-shell electrode catalyst according to claim 3, wherein the palladium-transition metal core-based core-shell electrode catalyst has 0.5 to 0.75 A/mgPGM of an activity per mass (mass activity) and 1160 to 1400 $\mu Acm^{-2}$ of an activity per unit area (specific activity).

* * * * *